United States Patent [19]
Wilson

[11] 3,798,992
[45] Mar. 26, 1974

[54] RACK AND PINION DRIVES
[75] Inventor: Anthony Ian Wilson, Leigh-on-Sea, England
[73] Assignee: Teleflex Limited, Essex Basildon, England
[22] Filed: Feb. 8, 1973
[21] Appl. No.: 278,924

[52] U.S. Cl. .................................. 74/422, 74/464
[51] Int. Cl. ........................ F16h 1/04, F16h 55/06
[58] Field of Search ............................ 74/422, 464

[56] References Cited
UNITED STATES PATENTS
3,554,048   1/1971   Adams .......................... 74/498

Primary Examiner—Leonard H. Gerin

[57] ABSTRACT
A rack and pinion device has an anti-friction bearing comprising a series of bearing blls to support the rack in lateral thrust.

14 Claims, 4 Drawing Figures

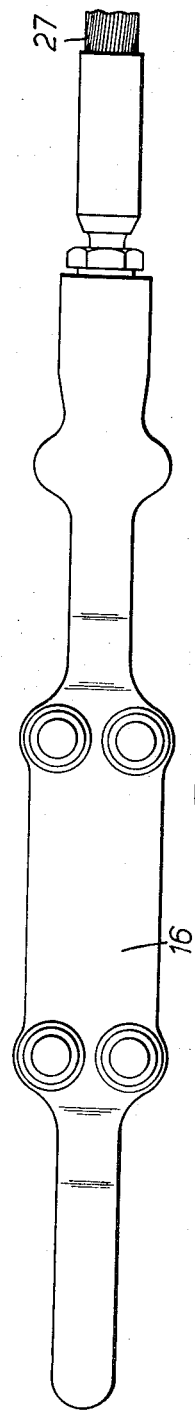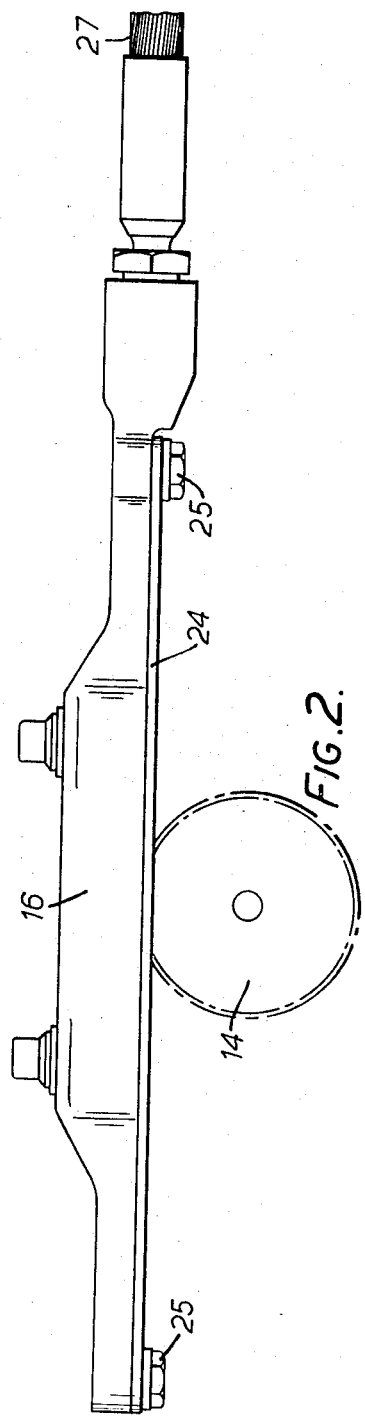

PATENTED MAR 26 1974

RACK AND PINION DRIVES

This invention relates to mechanical transmission devices.

According to the invention there is provided a mechanical transmission device comprising a rack, a guideway in which the rack is longitudinally movable, and a bearing means providing a support for the side of the rack opposite to the rack teeth and in the region of said rack subjected, in use, to lateral thrust by a pinion meshing with said rack teeth, said bearing means comprising a series of bearing elements in running contact with the first-mentioned side of said rack and arranged to recirculate around a closed track as the rack is longitudinally moved in its said guideway.

The invention is particularly, but not exclusively, applicable to an arrangement in which the endwise motion of a flexible mechanical transmission cable is converted to rotary motion of a pinion, or vice versa, by means of a rack in mesh with the pinion and connected with the cable. If such an arrangement is heavily loaded, there is considerable lateral thrust on the rack at the region where the pinion meshes with it, and therefore high friction of the rack in its guideway. If such a rack is supported in accordance with the invention then it will slide easily even if the load being transmitted is high.

In order that the invention may be well understood there will now be described one embodiment thereof, given by way of example only, reference being had to the accompanying drawings, in which:

FIG. 1 is a plan view of a rack and pinion drive unit;

FIG. 2 is a side elevation of the same drive unit;

Figure 3:
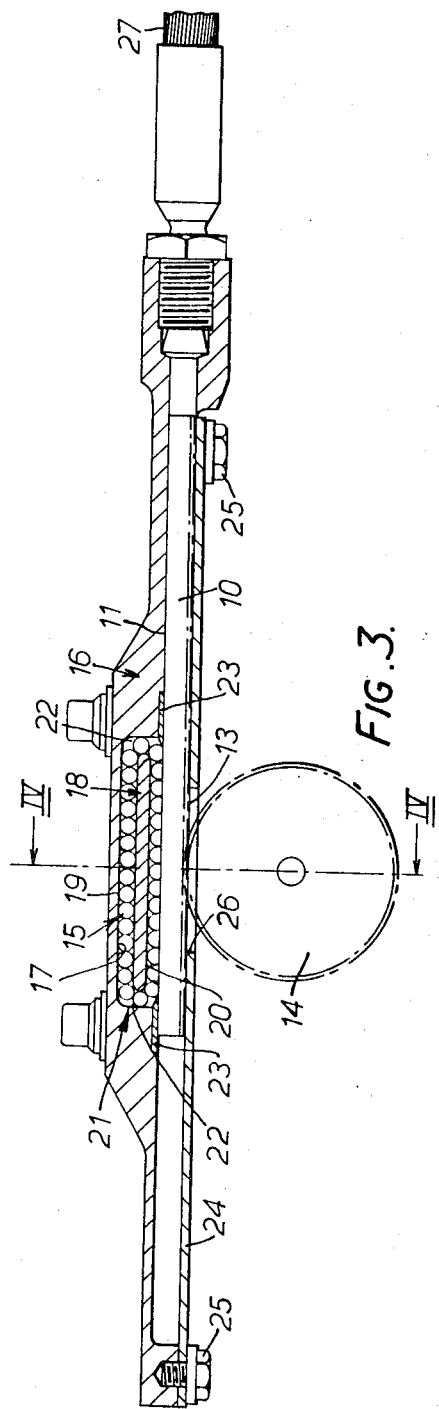
FIG. 3 is a longitudinal sectional view of the same drive unit.
Figure 4:
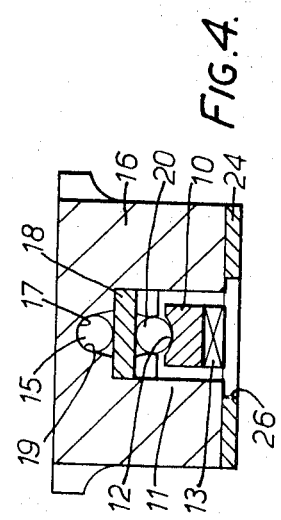
FIG. 4 is a cross-section taken along the line IV—IV of FIG. 3.

The drive unit illustrated consists of a steel rack 10 sliding rectilinearly in a guideway 11 and having a ball track 12 machined into one longitudinal face and rack teeth 13 on the opposing face meshing with a pinion 14. The rack is backed-up under load by a series of steel balls 15 running in the ball track 12 and recirculating in a recirculation track 17 provided within a steel or aluminium housing 16. The rack load is transferred into the housing by a hardened steel plate 18 having tongues which locate under shoulders within the housing, this plate sustaining the thrust of the rack 10 upon the balls 15 in the ball track 12.

The recirculation track 17 comprises upper and lower runs constituted by respective grooves 19 and 20 respectively formed in the housing 16 and lower surface of the plate 18. The plate 18 is housed in a chamber 21 fashioned in the housing 16 and open to the guideway 11 which is constituted by a recess in the lower face of the housing. The balls 15 located in the ball track 12 support the plate 18 on the rack 10. The length of the plate 18 is less than that of the chamber 21 so that end runs 22 of the track are defined between the plate ends and the confronting end walls of the chamber. To ensure that the balls 15 transfer easily between the end runs 22 and the lower run of the track, chamfered plates 23 are provided, such plates being held between the housing 16 and the upper surface of the rack 10. The groove 19 is so sized that when the plate 18 engages the housing shoulders (constituting the upper end wall of the chamber 21) the balls 15 in that groove are not loaded but are free to run easily therein on top of the plate.

At the toothed side of the rack 10, the guideway 11 is closed by a cover plate 24 which is attached by three screws 25 to the underside of the housing and which serves to hold the balls 15, plate 18 and rack 10 therein. The cover plate 24 has a cut-out 26 to accommodate the rack-engaging pinion 14. The rack is connected to a flexible mechanical transmission cable running within a rigid or flexible conduit 27, which cable transmits operating loads in either direction.

The whole assembly provides a high efficiency system for changing linear to rotary motion or vice versa.

If, instead of the balls 15, rollers are used this will eliminate the need to grind the track 12 in the face of the rack. Rollers have the further advantage that, if the surface of the rack engaging them is slightly crowned, a centering or self-aligning influence will be exerted on the rack and pinion.

The drive unit can be supplied with or without the pinion 14.

What we claim is:

1. A mechanical transmission device comprising a rack, a guideway in which the rack is longitudinally movable, and a bearing means providing a support for the side of the rack opposite to the rack teeth and in the region of said rack subjected, in use, to lateral thrust by a pinion meshing with said rack teeth, said bearing means comprising a series of bearing elements in running contact with the first-mentioned side of said rack and arranged to recirculate around a closed track as the rack is longitudinally moved in its said guideway.

2. A device as claimed in claim 1, wherein said bearing elements comprise rollers.

3. A device as claimed in claim 1, wherein said bearing elements comprise balls.

4. A device as claimed in claim 3, wherein said track has one run thereof partly formed in the first-mentioned side of said rack.

5. A device as claimed in claim 1, including a housing in which said guideway is provided, said bearing elements transferring lateral thrust when imposed on said rack to said housing.

6. A device as claimed in claim 5, wherein said track is located in said housing with the opposite runs of said track defined from one another by a plate serving to transfer, in use, loading imparted by the rack to those bearing elements in contact therewith, to said housing.

7. A device as claimed in claim 6, wherein one run of said track is defined in said housing and the opposite run of said track (containing those bearing elements in contact with the rack) is defined in said plate.

8. A device as claimed in claim 7, wherein said housing includes a chamber open to said guideway, said plate being located in said chamber and supported therein on those bearing elements in contact with said rack.

9. A device as claimed in claim 8, wherein said plate has a length less than that of said chamber to define between each of its opposite ends and the confronting wall of the chamber, end runs of said track.

10. A device as claimed in claim 9, including chamfered members between the housing and the first-mentioned side of said rack for assisting passage of said bearing elements between said end runs and the run of the track containing the bearing elements in contact with the rack.

11. A device as claimed in claim 8, wherein said plate, under loading imparted thereto by said bearing elements, will engage the chamber wall thereby to transfer such loading to said housing.

12. A device as claimed in claim 11, wherein said one run of said track is constituted by a groove in said housing and open to said chamber, said groove being sized such that when said plate engages the chamber wall, the bearing elements located within said groove run freely therein.

13. A device as claimed in claim 5, wherein said guideway comprises a recess formed in a face of said housing, and including a cover member attached to that face to hold said rack, plate and bearing elements in said housing.

14. A device as claimed in claim 1, including a push-pull cable operably connected with said rack.

* * * * *